US010068526B2

(12) United States Patent
Xu et al.

(10) Patent No.: US 10,068,526 B2
(45) Date of Patent: Sep. 4, 2018

(54) PIXEL CIRCUIT AND DRIVING METHOD THEREOF, DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Pan Xu, Beijing (CN); Zhongyuan Wu, Beijing (CN); Yuting Zhang, Beijing (CN); Yongqian Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 47 days.

(21) Appl. No.: 15/102,993

(22) PCT Filed: Oct. 23, 2015

(86) PCT No.: PCT/CN2015/092680
§ 371 (c)(1),
(2) Date: Jun. 9, 2016

(87) PCT Pub. No.: WO2016/201847
PCT Pub. Date: Dec. 22, 2016

(65) Prior Publication Data
US 2017/0193904 A1 Jul. 6, 2017

(30) Foreign Application Priority Data
Jun. 19, 2015 (CN) .......................... 2015 1 0346349

(51) Int. Cl.
*G09G 5/10* (2006.01)
*G09G 3/36* (2006.01)
(Continued)

(52) U.S. Cl.
CPC ......... *G09G 3/3258* (2013.01); *G09G 3/3241* (2013.01); *G09G 2300/0842* (2013.01);
(Continued)

(58) Field of Classification Search
CPC .................................................... G09G 3/3233
See application file for complete search history.

(56) References Cited

U.S. PATENT DOCUMENTS

2003/0234754 A1 12/2003 Abe et al.
2004/0183758 A1 9/2004 Chen et al.
(Continued)

FOREIGN PATENT DOCUMENTS

CN 102290027 A 12/2011
CN 103531151 A 1/2014
(Continued)

OTHER PUBLICATIONS

First Chinese Office Action dated Dec. 14, 2016; Appln. No. 201510346349.5.
International Search Report and Written Opinion dated Mar. 24, 2016; PCT/CN2015/092680.

*Primary Examiner* — Nan-Ying Yang
(74) *Attorney, Agent, or Firm* — Ladas & Parry LLP

(57) ABSTRACT

There are disclosed a pixel circuit and a driving method of the same and a display apparatus. The pixel circuit comprises: a driving transistor (Tr), a storage capacitor (Cs), a data writing module (10), a light-emitting element (20) and a predetermined voltage writing module (30). A first terminal of the storage capacitor (Cs) is connected to a gate of the driving transistor (Tr) and a second terminal thereof is connected to a second electrode of the driving transistor (Tr).
(Continued)

The predetermined voltage writing module (30) is configured to make the second electrode of the driving transistor (Tr) reach a predetermined potential in a pre-charging phase and a compensating phase; and the data writing module (10) is configured to store a data voltage of a data line into the storage capacitor (Cs) in the compensating phase. In the pixel circuit and the driving method thereof and the display apparatus, the driving current is not affected by the threshold voltage, and influence of the voltage across the light-emitting element on the driving current is eliminated, thereby the uniformity of luminance of the light-emitting element is raised and improving the display effect of the display apparatus is improved.

14 Claims, 2 Drawing Sheets

(51) Int. Cl.

| | |
|---|---|
| ***G06F 3/038*** | (2013.01) |
| ***G09G 5/00*** | (2006.01) |
| ***G09G 3/3258*** | (2016.01) |
| ***G09G 3/3241*** | (2016.01) |

(52) U.S. Cl.
CPC ............... *G09G 2310/0248* (2013.01); *G09G 2320/0233* (2013.01); *G09G 2320/043* (2013.01)

(56) References Cited

U.S. PATENT DOCUMENTS

| | | | | |
|---|---|---|---|---|
| 2004/0217925 | A1* | 11/2004 | Chung ................. | G09G 3/3233 345/76 |
| 2005/0200575 | A1 | 9/2005 | Kim et al. | |
| 2005/0269959 | A1* | 12/2005 | Uchino ................ | G09G 3/2011 315/169.3 |
| 2016/0204166 | A1 | 7/2016 | Yang | |

FOREIGN PATENT DOCUMENTS

| | | | |
|---|---|---|---|
| CN | 104217679 | A | 12/2014 |
| CN | 104715726 | A | 6/2015 |
| CN | 104867456 | A | 8/2015 |
| TW | I410932 | B | 1/2013 |

* cited by examiner

PIXEL CIRCUIT AND DRIVING METHOD THEREOF, DISPLAY APPARATUS

TECHNICAL FIELD

The present disclosure relates to a pixel circuit, a driving method thereof, and a display apparatus.

BACKGROUND

An organic light-emitting diode (OLED) display apparatus has advantages of self-luminescent, high contrast, wide color gamut or the like, and at the same time since it has the low power consumption, and is easy to realize flexible display, its application prospect is broad.

Each pixel circuit of the organic light-emitting diode display apparatus is integrated with a group of thin film transistors and a storage capacitor. Controlling current flowing through the light-emitting element is realized by controlling the driving of the thin film transistors and the storage capacitor.

However, magnitude of driving current would be affected by voltage of two terminals of a light-emitting element when it emits light. Under the influence of process conditions, the voltages of two terminals of different light-emitting elements in the display apparatus are also not exactly the same when the light-emitting element emits light, such that the phenomenon of non-uniformity of luminance occurs.

SUMMARY

There are provided in some embodiments of the present disclosure a pixel circuit, a driving method of the same, and a display apparatus, so as to prevent the voltage across a light-emitting element from influencing the driving current.

The pixel circuit provided in an embodiment of the present disclosure comprises: a driving transistor, a storage capacitor, a data writing module, a light-emitting element and a predetermined voltage writing module;

a first terminal of the storage capacitor is connected to a gate of the driving transistor, a second terminal thereof is connected to a second electrode of the driving transistor, and a first electrode of the driving transistor is connected to a high level input terminal, the second electrode thereof is connected to an anode of the light-emitting element, and a cathode of the light-emitting element is connected to a low level input terminal;

the predetermined voltage writing module is configured to make the second electrode of the driving transistor reach a predetermined potential in a pre-charging phase and a compensating phase; and the data writing module is configured to store a data voltage of a data line into the storage capacitor in the compensating phase.

Optionally, the data writing module has a first input terminal connected to the high level input terminal, a second input terminal connected to the data line, and an output terminal connected to the first terminal of the storage capacitor, and is configured to store a voltage of the high level input terminal into the storage capacitor in the pre-charging phase, so that a potential of the first terminal of the storage capacitor is higher than a potential of the second terminal of the storage capacitor in the compensating phase, and so that the storage capacitor is discharged and stores the data voltage and a voltage having a value equal to the threshold voltage of the driving transistor into the storage capacitor after a process of discharging is ended.

Optionally, the data writing module comprises a first transistor, a second transistor, a third transistor, a first scanning terminal and a second scanning terminal;

A gate of the first transistor is connected to the first scanning terminal, a first electrode thereof is connected to the high level input terminal, and a second electrode thereof is connected to the gate of the driving transistor;

A gate of the second transistor is connected to the second scanning terminal, a first electrode thereof is connected to the data line, and a second electrode thereof is connected to a second electrode of the third transistor, a first electrode and a gate of the third transistor are both connected to the gate of the driving transistor, and a threshold voltage of the third transistor is the same as the threshold voltage of the driving transistor; and The first scanning terminal is used to provide a turn-on signal in the pre-charging phase; the second scanning terminal is used to provide the turn-on signal in the compensating phase.

Optionally, the first scanning terminal is connected to a first gate line, and the second scanning terminal is connected to a second gate line.

Optionally, the predetermined voltage writing module comprises a fourth transistor, a fourth scanning terminal and a predetermined voltage input terminal, wherein a gate of the fourth transistor is connected to the fourth scanning terminal, a first electrode thereof is connected to the second electrode of the driving transistor, and a second electrode thereof is connected to the predetermined voltage input terminal, and the fourth scanning terminal is configured to provide the turn-on signal in the pre-charging phase and the compensating phase and provide a turn-off signal in the light-emitting phase.

Optionally, the predetermined voltage writing module further comprises a fifth transistor and a fifth scanning terminal, wherein a gate of the fifth transistor is connected to the fifth scanning terminal, a first electrode thereof is connected to the high level input terminal, and a second electrode thereof is connected to the first electrode of the driving transistor, and the fifth scanning terminal is configured to provide the turn-off signal in the pre-charging phase and the compensating phase and provide the turn-on signal in the light-emitting phase.

Optionally, the fourth scanning terminal is connected to a fourth gate line, and the fifth scanning terminal is connected to a fifth gate line.

Optionally, an input voltage of the predetermined voltage input terminal is zero.

Optionally, the low level input terminal is taken as the predetermined voltage input terminal.

Correspondingly, there is further provided in an embodiment of the present disclosure a driving method of a pixel circuit, the pixel circuit being the pixel circuit provided in the embodiment of the present disclosure, and the driving method comprising:

in a pre-charging phase, writing a voltage into a second electrode of a driving transistor by a predetermined voltage writing module, so that a potential of the second electrode of the driving transistor is a predetermined potential;

in a compensating phase, storing a data voltage of a data line into a storage capacitor by a data writing module; and in a light-emitting phase, connecting a high level input terminal with an anode of a light-emitting element, so that the light-emitting element emits light.

Optionally, the driving method comprises:

in the pre-charging phase, storing a voltage of the high level input terminal into the storage capacitor by the data writing module; and in the compensating phase, connecting the data line to a first terminal of the storage capacitor by the data writing module, so that the storage capacitor is discharged and the data voltage of the data line and a voltage having a value equal to a threshold voltage of the driving transistor are stored into the storage capacitor after discharging is ended.

Optionally, the data writing module comprises a first transistor, a second transistor, a third transistor, a first scanning terminal and a second scanning terminal, wherein a gate of the first transistor is connected to the first scanning terminal, a first electrode thereof is connected to the high level input terminal, and a second electrode thereof is connected to the gate of the driving transistor; and a gate of the second transistor is connected to the second scanning terminal, a first electrode thereof is connected to the data line, and a second electrode thereof is connected to a second electrode of the third transistor, a first electrode and a gate of the third transistor are both connected to the gate of the driving transistor, and a threshold voltage of the third transistor is the same as the threshold voltage of the driving transistor;

The driving method comprises:

in the pre-charging phase, providing a turn-on signal to the first scanning terminal and providing a turn-off signal to the second scanning terminal respectively, so that the first transistor is turned on, the second transistor is turned off, and the voltage of the high level input terminal is stored into the storage capacitor through the first transistor;

in the compensating phase, providing the turn-on signal to the second scanning terminal and providing the turn-off signal to the first scanning terminal respectively, so that the second transistor and the third transistor are turned on, and at the same time, the first transistor is turned off, and so that the data voltage and the threshold voltage of the third transistor are stored into the storage capacitor after discharging of the storage capacitor is ended;

in the light-emitting phase, providing the turn-off signal to the first scanning terminal and the second scanning terminal respectively, so that the first transistor and the second transistor are turned off.

Optionally, the predetermined voltage writing module comprises a fourth transistor, a fourth scanning terminal and a predetermined voltage input terminal, wherein a gate of the fourth transistor is connected to the fourth scanning terminal, a first electrode thereof is connected to the second electrode of the driving transistor, and a second electrode thereof is connected to the predetermined voltage input terminal; the driving method comprises:

in the pre-charging phase and the compensating phase, providing the turn-on signal to the fourth scanning terminal, so that the fourth transistor is turned on, and the second electrode of the driving transistor is connected to the predetermined voltage input terminal;

in the light-emitting phase, providing the turn-off signal to the fourth scanning terminal, so that the fourth transistor is turned off, and the high level input terminal is connected to the anode of the light-emitting element.

Optionally, the predetermined voltage writing module further comprises a fifth transistor and a fifth scanning terminal, wherein a gate of the fifth transistor is connected to the fifth scanning terminal, a first electrode thereof is connected to the high level input terminal, and a second electrode thereof is connected to the first electrode of the driving transistor. The driving method further comprises:

in the pre-charging phase and the compensating phase, providing the turn-off signal to the fifth scanning terminal; in the light-emitting phase, providing the turn-on signal to the fifth scanning terminal, so that the fifth transistor is turned off in the pre-charging phase and the compensating phase and is turned on in the light-emitting phase, so that the high level input terminal and the light-emitting element are disconnected in the pre-charging phase and the compensating phase and are connected in the light-emitting phase.

Optionally, a voltage inputted to the predetermined voltage input terminal is zero.

Optionally, the low level input terminal is taken as the predetermined voltage input terminal.

Correspondingly, there is further provided in an embodiment of the present disclosure a display apparatus, comprising a plurality of pixel circuits provided in the embodiment of the present disclosure.

In the embodiment of the present disclosure, the second electrode of the driving transistor reaches the predetermined potential in the pre-charging phase and the compensating phase. In the compensating phase, the voltage stored in the storage capacitor is unrelated with a voltage across the light-emitting element, and a gate-source voltage of the driving transistor is also unrelated with the voltage across the light-emitting element. Bootstrap effect of the storage capacitor makes that the gate-source voltage of the driving transistor in the light-emitting phase maintain the same as that in the compensating phase, so that the driving current flowing through the light-emitting element is unrelated with the voltage across the light-emitting element, so as to eliminate phenomenon of display non-uniformity caused by factors such as aging of the light-emitting element or the like.

DETAILED DESCRIPTION

Specific implementations of the present disclosure will be described in detail by combining with the figures. It shall be understood that the specific implementations described below are just used to describe and explain the present disclosure, instead of being used to limit the present disclosure.

Figure 1:
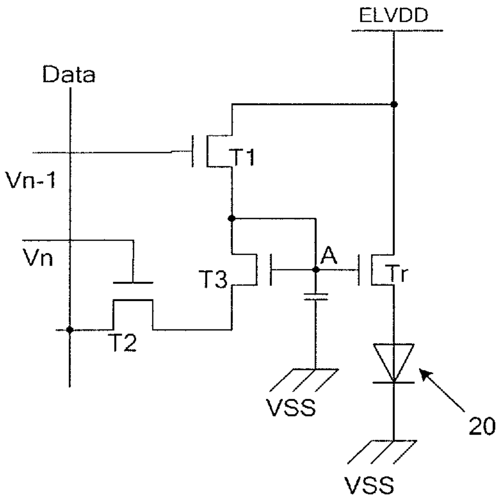
FIG. 1 is a schematic diagram of a structure of a known pixel circuit.

FIG. 1 is a schematic diagram of a structure of a known pixel structure. As shown in FIG. 1, the pixel circuit comprises four thin film transistors T1, T2, T3, and Tr and one storage capacitor Cs. ELVDD is a high level input terminal, VSS is a low level input terminal, Data is a data line, and Vn−1 and Vn are scanning lines.

In FIG. 1, the driving current flowing through the light-emitting element is:

$$I_{oled}k(V_{data}-V_{oled})^2$$

where k is a constant related with a structure of a driving transistor Tr, $V_{data}$ is a data voltage, and $V_{oled}$ is a voltage of two terminals of the light-emitting element when it emits light.

Figure 2:
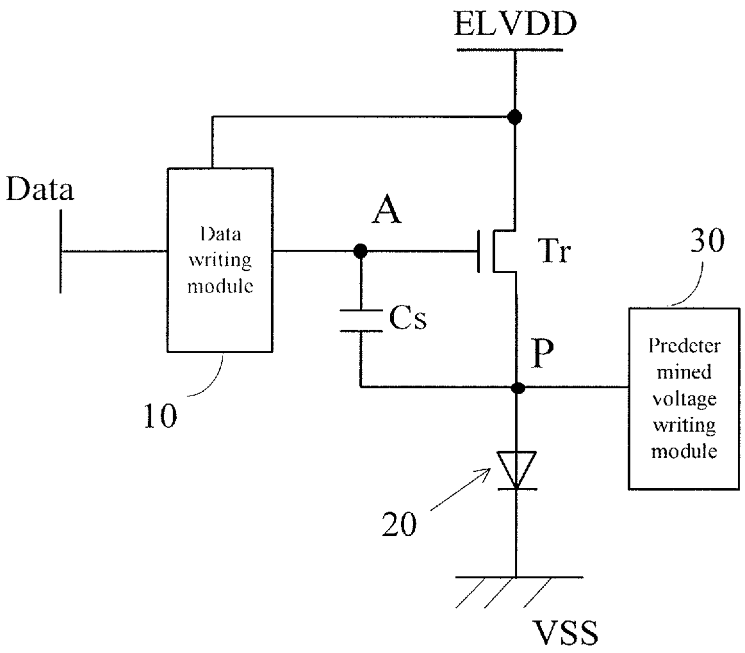
FIG. 2 is a block diagram of a structure of a pixel circuit in an embodiment of the present disclosure.

FIG. 2 shows schematically a block diagram of a structure of a pixel circuit in an embodiment of the present disclosure.

As shown in FIG. 2, according to one aspect of the present disclosure, there is provided a pixel circuit, comprising: a driving transistor Tr, a storage capacitor Cs, a data writing module 10, a light-emitting element 20 and a predetermined voltage writing module 30.

A first terminal of the storage capacitor Cs is connected to a gate of the driving transistor Tr, and a second terminal thereof is connected to a second electrode of the driving transistor Tr. A first electrode of the driving transistor Tr is connected to the high level input terminal ELVDD, a second electrode thereof is connected to an anode of the light-emitting element 20, and a cathode of the light-emitting element 20 is connected to the low level input terminal VSS.

The predetermined voltage writing module 30 is configured to make the second electrode (i.e., node P) of the driving transistor Tr reach a predetermined potential in the pre-charging phase and the compensating phase.

The data writing module 10 is configured to store a data voltage on a data line into the storage capacitor Cs in the compensating phase.

In the embodiment of the present disclosure, the storage capacitor Cs is connected between the gate and the second electrode of the driving transistor Tr, and the second electrode of the driving transistor Tr reaches a predetermined potential $V_0$ in the pre-charging phase and the compensating phase. The data writing module 10 can store the data voltage $V_{data}$ into the storage capacitor Cs in the compensating phase. Therefore, in the compensating phase, a voltage of two terminals of the storage capacitor Cs is $V_{data}-V_0$. That is, before the light-emitting phase, a gate-source voltage $V_{gs}$ of the driving transistor Tr is $V_{data}-V_0$. Therefore, in the light-emitting phase, even if the voltage $V_{oled}$ of the two terminals of the light-emitting element 20 makes the potential of the second electrode of the driving transistor Tr rise, it would also make the gate-source voltage $V_{gs}$ of the driving transistor Tr maintain unchanged due to the bootstrap effect of the storage capacitor Cs. The driving current flowing through the light-emitting element is:

$$I_{oled}=k(V_{gs}-V_{thr})^2=k(V_{data}-V_0-V_{thr})^2;$$

where k is a constant related with the structure of the driving transistor, and $V_{thr}$ is a the threshold voltage of the driving transistor Tr.

In the pixel circuit as shown in FIG. 1, the second terminal of the storage capacitor is connected to the low level input terminal VSS, and the cathode of the light-emitting element 20 is also connected to the low level input terminal. Since the voltages of the two terminals of the light-emitting elements 20 (voltage across the light-emitting element 20) in the respective pixel units may be different, so that the gate-source voltage Vgs of the driving transistor Tr in different pixel units may also be different, and thus the driving current flowing through the light-emitting element in different pixel units would be different, which causes non-uniformity of light-emitting luminance.

In the embodiment of the present disclosure as shown in FIG. 2, one terminal of the storage capacitor Cs is connected to the anode of the light-emitting element 20, and another terminal thereof is connected to the gate of the driving transistor Tr. It can be seen from the formula of the driving current that the driving current flowing through the light-emitting element 20 would not be influenced by the voltage across the light-emitting element, so that the influence on the uniformity of light-emitting due to the inconsistency of the voltages across different light-emitting elements 20 is eliminated.

Further, as shown in FIG. 2, a first input terminal of the data writing module 10 is connected to the high level input terminal ELVDD, a second input terminal thereof is connected to the data line Data, and an output terminal thereof is connected to the first terminal of the storage capacitor Cs. The data writing module 10 is configured to store the voltage of the high level input terminal into the storage capacitor Cs in the pre-charging phase, so that the potential of the first terminal of the storage capacitor Cs is higher than that of the second terminal of the storage capacitor Cs in the compensating phase, and thus the storage capacitor Cs is discharged, and the data voltage and a voltage having a value equal to the threshold voltage of the driving transistor Tr are stored into the storage capacitor Cs after discharging is ended.

The second electrode of the driving transistor Tr reaches the predetermined potential $V_0$ in the pre-charging phase and the compensating phase, and the threshold voltage of the driving transistor Tr is $V_{thr}$. In the pre-charging phase, a voltage between the first terminal of the storage capacitor Cs and a ground is equal to the voltage of the high level input terminal ELVDD, and a voltage between the second terminal of the storage capacitor and the ground is $V_0$. Therefore, in the compensating phase, after the discharging of the storage capacitor is ended, the voltage across the storage capacitor Cs is $V_{data}+V_{th}-V_0$. In the light-emitting phase, the bootstrap effect of the storage capacitor would also make the gate-source voltage $V_{gs}$ of the driving transistor Tr maintain unchanged. The driving current flowing through the light-emitting element is:

$$I_{oled}=k(V_{gs}-V_{thr})^2=k(V_{data}-V_0)^2$$

It can be seen that the driving current $I_{oled}$ is unrelated with the threshold voltage of the driving transistor Tr, so that phenomenon of luminance non-uniformity of the light-emitting element caused by threshold voltage drift of the driving transistor is eliminated. In addition, the driving current is also unrelated with the voltage of the high level input terminal ELVDD, so that the problem of the resistance drop (IR drop) is eliminated.

The light-emitting element 20 in the embodiment of the present disclosure is an organic light-emitting diode. It can be understood that since the pre-charging phase and the compensating phase prior to the light-emitting phase occupies a short time within one frame period, influence of the voltage of the second electrode of the driving transistor on the driving current of the light-emitting element is small. In order to prevent the light-emitting element 20 from emitting light before the light-emitting phase, the predetermined potential $V_0$ may not be greater than the potential of the cathode of the light-emitting element 20.

The voltage having a value equal to the threshold voltage of the driving transistor Tr indicates that the manner of obtaining the threshold voltage is not limited. The threshold voltage of the driving transistor Tr may be obtained directly, or a threshold voltage of a transistor equal to the threshold voltage of the driving transistor may be also obtained, so as to obtain the threshold voltage of the driving transistor Tr indirectly.

Figure 3:
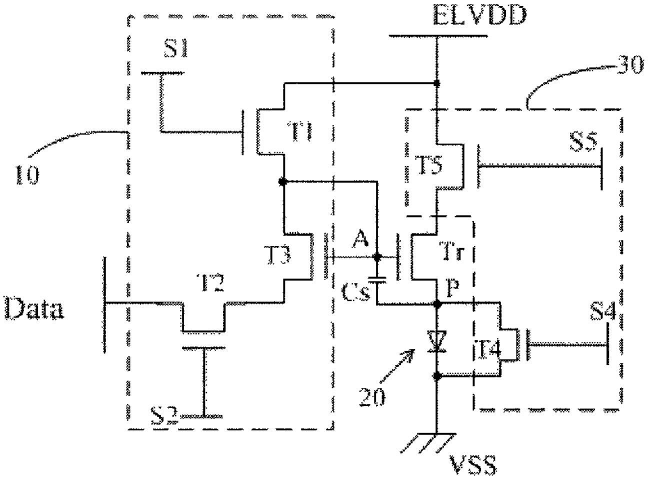
FIG. 3 is a schematic diagram of a specific structure of a pixel circuit in an embodiment of the present disclosure.

FIG. 3 shows exemplarily a schematic diagram of a structure of a pixel circuit in an embodiment of the present disclosure. As shown in FIG. 3, the data writing module 10 comprises a first transistor T1, a second transistor T2, a third transistor T3, a first scanning terminal S1 and a second scanning terminal S2. A gate of the first transistor T1 is connected to the first scanning terminal S1, a first electrode thereof is connected to the high level input terminal ELVDD (i.e., the first electrode of the first transistor T1 and a first input terminal of the data writing module 10 are a same terminal), and a second electrode thereof is connected to the gate of the driving transistor Tr.

A gate of the second transistor T2 is connected to the second scanning terminal S2, and a first electrode thereof is connected to the data line Data (i.e., the first electrode of the second transistor T2 and a second input terminal of the data writing module 10 are a same terminal). A second electrode of the second transistor T2 is connected to a second electrode of the third transistor T3. Both a first electrode and a gate of the third transistor T3 are connected to the gate of the driving transistor Tr. A threshold voltage of the third transistor T3 is the same as the threshold voltage of the driving transistor Tr.

The first scanning terminal S1 is used to provide a turn-on signal in the pre-charging phase; the second scanning terminal S2 is used to provide the turn-on signal in the compensating phase.

In the pre-charging phase, the first scanning terminal S1 controls the first transistor T1 to be turned on, and the high level signal terminal ELVDD charges the storage capacitor Cs through the first transistor T1 until the potential of the first terminal of the storage capacitor Cs reaches $V_{dd}$. In the compensating phase, the second scanning terminal S2 controls the second transistor T2 to be turned on, the third transistor T3 forms a diode connection, and the storage capacitor Cs is discharged until the potential of the first terminal of the storage capacitor Cs reaches $V_{data}+V_{th3}$.

The third transistor T3 is a mirror transistor of the driving transistor Tr, and has electrical characteristics the same as the driving transistor Tr. The threshold voltage of the driving transistor Tr can be obtained indirectly by obtaining the threshold voltage of the third transistor T3, and the third transistor T3 and the driving transistor Tr form a mirror current source, so as to provide a stable driving current for the light-emitting element, thereby enhancing stability of the circuit.

Further, as shown in FIG. 3, the predetermined voltage writing module 30 comprises a fourth transistor T4, a fourth scanning terminal S4 and a predetermined voltage input terminal. A gate of the fourth transistor T4 is connected to the fourth scanning terminal S4, a first electrode thereof is connected to the second electrode of the driving transistor Tr, and a second electrode thereof is connected to the predetermined voltage input terminal. The fourth scanning terminal S4 is used to provide the turn-on signal in the pre-charging phase and the compensating phase and provide the turn-off signal in the light-emitting phase, so that the fourth transistor T4 is turned on in the pre-charging phase and the compensating phase, and the node P reaches the predetermined potential.

When the predetermined voltage writing module 30 comprises the fourth transistor T4, in order to prevent occurrence of the situation that the potential of the node P rises because the fourth transistor T4 is connected with the driving transistor Tr in series to divide the voltage, optionally, the predetermined voltage writing module 30 can further comprise a fifth transistor T5 and a fifth scanning terminal S5. A gate of the fifth transistor T5 is connected to the fifth scanning terminal S5, a first electrode thereof is connected to the high level input terminal ELVDD, and a second electrode thereof is connected to the first electrode of the driving transistor Tr. The fifth transistor T5 is used to provide the turn-off signal in the pre-charging phase and the compensating phase and provide the turn-on signal in the light-emitting phase. Therefore, in the pre-charging phase and the compensating phase, the fifth transistor T5 is turned off, and the potential of node P reaches the predetermined potential, without being affected by the voltage of the high level input terminal ELVDD.

Alternatively, the input voltage of the predetermined voltage input terminal may be 0, that is, the predetermined voltage input terminal is connected to the ground. The low level input terminal VSS can be taken as the predetermined voltage input terminal to reduce the setting of the signal terminals, so as to simplify the circuit structure.

In the compensating phase, after the discharging of the storage capacitor Cs is completed, the voltage of the two terminals of the storage capacitor Cs is $V_{data}+V_{th3}$. In the light-emitting phase, the bootstrap effect of the storage capacitor makes the voltage of the two terminals of the storage capacitor Cs maintain the same as that in the compensating phase, and the voltage is still $V_{data}+V_{th3}$. The driving current flowing through the light-emitting element 20 is:

$$\begin{aligned} I_{oled} &= (W/2L)\mu_n C_{ox}(V_{gs}-V_{thr})^2 \\ &= (W/2L)\mu_n C_{ox}(V_{data}+V_{th3}-V_{thr})^2 \end{aligned}$$

where $I_{oled}$ is the driving current flowing through the light-emitting element 20; $V_{th3}$ is the threshold voltage of the third transistor T3; $V_{thr}$ is the threshold voltage of the driving transistor Tr; $\mu_n$ is carrier mobility rate; $C_{ox}$ is unit capacitance of a gate oxide layer of the driving transistor; and W/L is a length-width ratio of a conducting channel of the driving transistor.

As described above, the threshold voltage of the third transistor T3 is the same as the threshold voltage of the driving transistor Tr, i.e., $V_{th3}=V_{thr}$, and thus the driving current flowing through the light-emitting element 20 is as follows:

$$I_{oled}=(W/2L)\mu_n C_{ox}(V_{data})^2$$

In the display apparatus including the pixel circuit, a first gate line, a second gate line, a fourth gate line, a fifth gate line and gate driving circuits can be arranged. The first scanning terminal can be connected with the first gate line, the second scanning terminal can be connected with the second gate line, the fourth scanning terminal can be connected with the fourth gate line, and the fifth scanning terminal can be connected with the fifth gate line, so that the gate driving circuit provides driving signals to the first scanning terminal, the second scanning terminal, the fourth scanning terminal, and the fifth scanning terminal.

The respective transistors in the embodiment of the present disclosure are N-type transistors. The first electrode is a drain of the N-type transistor, and the second electrode is a source of the N-type transistor. Correspondingly, the turn-on signal is a high level signal, and the turn-off signal is a low level signal. Of course, the respective transistors can also be set as the P-type transistors. At this time, the first electrode is the source of the P-type transistor, and the second electrode is the drain of the P-type transistor. Correspondingly, the turn-on signal provided to the P-type transistor is the low level signal, and the turn-off signal provided to the P-type transistor is the high level signal.

Figure 4:
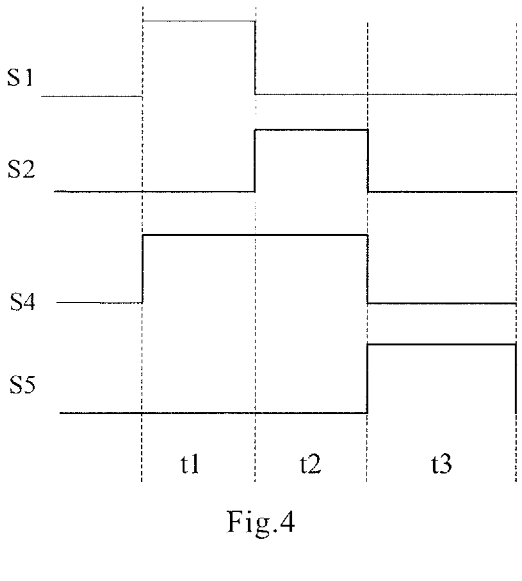
FIG. 4 is a schematic diagram of signals provided by respective scanning terminals of a pixel circuit in an embodiment of the present disclosure.

FIG. 4 shows a schematic diagram of signals provided by respective scanning terminals of a pixel circuit in an embodiment of the present disclosure.

According to another aspect of the present disclosure, there is provided a driving method of the pixel circuit described above, comprising following steps:

in the pre-charging phase, writing a voltage to the second electrode of the driving transistor Tr by the predetermine voltage writing module 20, so that the potential of the second electrode of the driving transistor is the predetermined potential, and storing the voltage of the high level input terminal into the storage capacitor Cs by the data writing module 10;

in the compensating phase, storing data voltage of the data line into the storage capacitor Cs by the data writing module 30;

in the light-emitting phase, connecting the high level input terminal to the anode of the light-emitting element 20 to make the light-emitting element 20 emit light.

Exemplarily, in the pre-charging phase, the voltage between the second terminal of the storage capacitor and the ground is $V_0$. In the compensating phase, the voltage of the two terminals of the storage capacitor Cs is $V_{data}-V_{thr}-V_0$. That is, before the light-emitting phase, the gate-source voltage $V_{gs}$ of the driving transistor Tr is $V_{data}-V_0$. Therefore, in the light-emitting phase, even if the voltage $V_{oled}$ of the two terminals of the light-emitting element 20 makes the potential of the second electrode of the driving transistor Tr rise, it would also make the gate-source voltage $V_{gs}$ of the driving transistor Tr maintain unchanged due to the bootstrap effect of the storage capacitor Cs. The driving current flowing through the light-emitting element is:

$$I_{oled}=k(V_{gs}-V_{thr})^2=k(V_{data}-V_0-V_{thr})^2$$

where k is a constant related with the structure of the driving transistor, $V_{thr}$ is the threshold voltage of the driving transistor Tr.

It can be seen that the driving current flowing through the light-emitting element is unrelated with the voltage across the light-emitting element 20, so that the phenomenon of non-uniformity of display caused by factors such as aging of the light-emitting element is eliminated.

As described above, the first input terminal of the data writing module 10 is connected to the high level input terminal ELVDD, the second input terminal thereof is connected to the data line Data, and the output terminal thereof is connected to the first terminal of the storage capacitor Cs. In this case, the driving method comprises:

in the pre-charging phase, storing the voltage of the high level input terminal into the storage capacitor by the data writing module 10; in the compensating phase, connecting the data line to the first terminal of the storage capacitor Cs by the data writing module 10, such that the storage capacitor Cs is discharged, and the data voltage of the data line and the voltage having a same value as the threshold voltage of the driving transistor are stored into the storage capacitor Cs after the discharging is ended.

In the pre-charging phase, the voltage between the first terminal of the storage capacitor Cs and the ground is equal to the voltage of the high level input terminal ELVDD, and the voltage between the second terminal of the storage capacitor and the ground is $V_0$. Therefore, in the compensating phase, after discharging of the storage capacitor is ended, the voltage of the two terminals of the storage capacitor Cs is $V_{data}+V_{thr}-V_0$. In the light-emitting phase, it would also make the gate-source voltage $V_{gs}$ of the driving transistor Tr maintain unchanged due to the bootstrap effect of the storage capacitor Cs. The driving current flowing through the light-emitting element is:

$$I_{oled}=k(V_{gs}-V_{thr})^2=k(V_{data}-V_0)^2$$

It can be seen that the driving current $I_{oled}$ is unrelated with the threshold voltage of the driving transistor Tr, so that the phenomenon of non-uniformity of luminance of the light-emitting element caused by the threshold voltage drift of the driving transistor is eliminated. In addition, the driving current is also unrelated with the voltage of the high level input terminal ELVDD, so that the problem of resistance drop (IR drop) is eliminated.

Exemplarily, as stated above, the data writing module 10 comprises a first transistor T1, a second transistor T2, a third transistor T3, a first scanning terminal S1 and a second scanning terminal S2. A gate of the first transistor T1 is connected to the first scanning terminal S1, a first electrode thereof is connected to the high level input terminal, and a second electrode thereof is connected to a gate of the driving transistor Tr;

A gate of the second transistor T2 is connected to the second scanning terminal S2, a first electrode thereof is connected to the data line, and a second electrode thereof is connected to a second electrode of the third transistor T3. Both a first electrode and a gate of the third transistor T3 are connected to the gate of the driving transistor Tr. The threshold voltage of the third transistor T3 is the same as the threshold voltage of the driving transistor Tr. In this case, the driving method comprises:

in the pre-charging phase (phase t1 as shown in FIG. 4), providing a turn-on signal to the first scanning terminal S1 and providing the turn-off signal to the second scanning terminal S2, so that the first transistor T1 is turned on, the second transistor T2 is turned off, and the voltage of the high level input terminal is stored into the storage capacitor Cs through the first transistor;

in the compensating phase (phase t2 as shown in FIG. 4), providing a turn-on signal to the second scanning terminal S2, providing a turn-off signal to the first scanning terminal S1 respectively, so that the second transistor T2 and the third transistor T3 are turned on, and at the same time, the first transistor T1 is turned off, and storing the data voltage $V_{data}$ and the threshold voltage of third transistor T3 into the storage capacitor Cs after the storage capacitor is discharged. The potential of the first terminal of the storage capacitor Cs reaches Vdd after the pre-charging phase is ended, which would turn on the third transistor T3. Therefore, the storage capacitor Cs is discharged through the third transistor. When the potential of the first terminal of the storage capacitor Cs is reduced to $V_{data}+V_{th3}$, the third transistor T3 is turned off, and the storage capacitor Cs stops discharging;

in the light-emitting phase (phase t3 as shown in FIG. 4), providing turn-off signals to the first scanning terminal S1 and the second scanning terminal S2 respectively, so that the first transistor T1 and the second transistor T2 are turned off.

The predetermined voltage writing module 30 comprises a fourth transistor T4, a fourth scanning terminal S4 and a predetermined voltage input terminal. A gate of the fourth transistor T4 is connected to the fourth scanning terminal S4, a first electrode thereof is connected to the second electrode of the driving transistor Tr, and a second electrode thereof is connected to the predetermined voltage input terminal. In this case, the driving method comprises:

in the pre-charging phase and the compensating phase, providing the turn-on signal to the fourth scanning terminal S4 to make the fourth transistor T4 turned on, so that the second electrode of the driving transistor Tr is connected to the predetermined voltage input terminal, and further the potential of the second electrode of the driving transistor Tr reaches the predetermined potential;

in the light-emitting phase, providing the turn-off signal to the fourth scanning terminal S4, so that the fourth transistor is turned off, and the high level input terminal ELVDD is connected to the anode of the light-emitting element 20.

The predetermined voltage writing module further comprises a fifth transistor T5 and a fifth scanning terminal S5. A gate of the fifth transistor T5 is connected to the fifth scanning terminal S5, a first electrode thereof is connected to the high level input terminal ELVDD, and a second electrode thereof is connected to the first electrode of the driving transistor Tr. In this case, the driving method further comprises:

in the pre-charging phase and the compensating phase, providing the turn-off signal to the fifth scanning terminal S5 and providing the turn-on signal to the fifth scanning terminal in the light-emitting phase, so that the fifth transistor T5 is turned off in the pre-charging phase and is turned on in the light-emitting phase, and the high level input terminal ELVDD is disconnected from the light-emitting element 20 in the pre-charging phase and the compensating phase and connected to the light-emitting element 20 in the light-emitting phase, so as to prevent the light-emitting element 20 from emitting light in the pre-charging phase and the compensating phase.

Exemplarily, the input voltage of the predetermined voltage input terminal is zero, that is, the potential of the node P is zero in the pre-charging phase and the compensating phase.

Alternatively, the low level input terminal VSS is taken as the predetermined voltage input terminal, so as to reduce setting of signal terminals and simplify the circuit structure.

According to another aspect of the present disclosure, there is provided a display apparatus, comprising a plurality of pixel circuits as described above. The display apparatus further comprises a plurality of data lines. A pixel circuit of each column is corresponding to one data line. The second input terminal of the data writing module is connected to a corresponding data line. In the compensating phase, the data voltage of the data line is stored into the storage capacitor.

In addition, the display apparatus can further comprise a plurality of gate line groups, and each of the gate line groups comprises a first gate line, a second gate line and a gate driving circuit. The first gate line is connected between the first scanning terminal S1 and the gate driving circuit, the second gate line is connected between the second scanning terminal S2 and the gate driving circuit, and the gate driving circuit can provide the turn-on signal to the first scanning terminal S1 in the pre-charging phase, and provide the turn-on signal to the second scanning terminal S2.

The predetermined voltage writing module 30 comprises a fourth transistor T4, a fourth scanning terminal S4 and a predetermined voltage input terminal. A gate of the fourth transistor T4 is connected to the fourth scanning terminal S4, a first electrode thereof is connected to the second electrode of the driving transistor Tr, and a second electrode thereof is connected to the predetermined voltage input terminal.

Each of the gate line groups further comprises a fourth gate line connected between the fourth scanning terminal S4 and the gate driving circuit. The gate driving circuit can provide the turn-on signal to the fourth scanning terminal S4 in the pre-charging phase and the compensating phase and provide the turn-off signal to the fourth scanning terminal S4 in the light-emitting phase, so that the fourth transistor T4 is turned on in the pre-charging phase and the compensating phase, the potential of the node P reaches the predetermined potential and the fourth transistor T4 is turned off in the light-emitting phase, and thus the high level input terminal is conducted to the anode of the light-emitting element.

The predetermined voltage writing module further comprises a fifth transistor T5 and a fifth scanning terminal S5. A gate of the fifth transistor T5 is connected to the fifth scanning terminal S5, a first electrode thereof is connected to the high level input terminal ELVDD, and a second electrode thereof is connected to the first electrode of the driving transistor Tr.

Each of the gate line groups further comprises a fifth gate line connected between the fifth scanning terminal S5 and the gate driving circuit. The gate driving circuit can provide the turn-off signal to the fifth scanning terminal S5 in the pre-charging phase and the compensating phase, and provide the turn-on signal to the fifth scanning terminal S5 in the light-emitting phase, so that the fifth transistor T5 is turned off in the pre-charging phase and the compensating phase and turned on in the light-emitting phase, so as to prevent the light-emitting element from emitting light in the pre-charging phase and the compensating phase.

The display apparatus can further comprise a grounding line. The predetermined voltage input terminal is connected to the grounding line, and at the same time, the low level input terminal can also be connected to the grounding line.

The display apparatus can be any product or component having a display function, such as a mobile phone, a tablet computer, a TV set, a display, a notebook computer, a digital photo frame, and a navigator and so on.

Since the pixel circuit provided in the embodiments of the present disclosure has good stability and the driving current is not affected by the threshold voltage and the voltage across the light-emitting element, the uniformity of luminance of the light-emitting element can be enhanced, so as to improve the display effect of the display apparatus.

It can be understood that the above implementations are just exemplary implementations used to describe principles of the present disclosure, but the present disclosure is not limited thereto. For those ordinary skilled in the art, various modifications and improvements can be made without departing from the spirit and substance of the present disclosure. These modifications and improvements are also deemed as the protection scope of the present disclosure.

The present application claims the priority of a Chinese patent application No. 201510346349.5 filed on Jun. 19, 2015. Herein, the content disclosed by the Chinese patent application is incorporated in full by reference as a part of the present disclosure.

What is claimed is:

1. A pixel circuit, comprising: a driving transistor, a storage capacitor, a data writing module, a light-emitting element and a predetermined voltage writing module;

a first terminal of the storage capacitor being connected to a gate of the driving transistor, a second terminal thereof being connected to a second electrode of the driving transistor, and a first electrode of the driving transistor being connected to a high level input terminal, a second electrode thereof being connected to an anode of the light-emitting element, and a cathode of the light-emitting element being connected to a low level input terminal;

the predetermined voltage writing module being connected to a second electrode of the driving transistor and being configured to make the second electrode of the driving transistor reach a predetermined potential in a pre-charging phase and a compensating phase; and the data writing module being configured to store a data voltage on a data line into the storage capacitor in the compensating phase, wherein the data writing module has a first input terminal connected to the high level input terminal, a second input terminal connected to the data line, and an output terminal connected to the first terminal of the storage capacitor, and is configured to store a voltage of the high level input terminal into the storage capacitor in the pre-charging phase, so that a potential of the first terminal of the storage capacitor is higher than a potential of the second terminal of the storage capacitor in the compensating phase, and the storage capacitor is discharged and the data voltage and a voltage having a value equal to the threshold voltage of the driving transistor are stored into the storage capacitor after the process of discharging is ended;

wherein the data writing module comprises a first transistor, a second transistor, a third transistor, a first scanning terminal and a second scanning terminal;

a gate of the first transistor is connected to the first scanning terminal, a first electrode thereof is connected to the high level input terminal, and a second electrode thereof is connected to the gate of the driving transistor;

a gate of the second transistor is connected to the second scanning terminal, a first electrode thereof is connected to the data line, and a second electrode thereof is connected to a second electrode of the third transistor, a first electrode and a gate of the third transistor are both connected to the gate of the driving transistor, and a threshold voltage of the third transistor is the same as the threshold voltage of the driving transistor;

the first scanning terminal is used to provide a turn-on signal in the pre-charging phase;

and the second scanning terminal is used to provide the turn-on signal in the compensating phase;

wherein the predetermined voltage writing module comprises a fourth transistor, a fourth scanning terminal and a predetermined voltage input terminal, a gate of the fourth transistor is connected to the fourth scanning terminal, a first electrode thereof is connected to the second electrode of the driving transistor, and a second electrode thereof is connected to the predetermined voltage input terminal, and the fourth scanning terminal is configured to provide the turn-on signal in the pre-charging phase and the compensating phase and provide a turn-off signal in the light-emitting phase.

2. The pixel circuit according to claim 1, the third transistor is a minor transistor of the driving transistor, and the third transistor and the driving transistor form a minor current source.

3. The pixel circuit according to claim 1, wherein the first scanning terminal is connected to a first gate line, and the second scanning terminal is connected to a second gate line.

4. The pixel circuit according to claim 1, wherein the predetermined voltage writing module further comprises a fifth transistor and a fifth scanning terminal, a gate of the fifth transistor is connected to the fifth scanning terminal, a first electrode thereof is connected to the high level input terminal, and a second electrode thereof is connected to the first electrode of the driving transistor, and the fifth scanning terminal is configured to provide the turn-off signal in the pre-charging phase and the compensating phase and provide the turn-on signal in the light-emitting phase.

5. The pixel circuit according to claim 4, wherein the fourth scanning terminal is connected to a fourth gate line, and the fifth scanning terminal is connected to a fifth gate line.

6. The pixel circuit according to claim 1, wherein an input voltage of the predetermined voltage input terminal is zero.

7. The pixel circuit according to claim 1, wherein the low level input terminal is taken as the predetermined voltage input terminal.

8. A driving method of a pixel circuit which is the pixel circuit according to claim 1, and the driving method comprising:

in a pre-charging phase, writing a voltage into the second electrode of the driving transistor by the predetermined voltage writing module to make a potential of the second electrode of the driving transistor be a predetermined potential;

in a compensating phase, storing a data voltage on a data line into the storage capacitor by the data writing module; and in a light-emitting phase, connecting a high level input terminal to an anode of the light-emitting element to make the light-emitting element emit light, wherein the driving method comprises:

in the pre-charging phase, storing a voltage of the high level input terminal into the storage capacitor by the data writing module;

in the compensating phase, connecting the data line to the first terminal of the storage capacitor by the data writing module to make the storage capacitor discharged, and storing the data voltage on the data line and a voltage having a value equal to a threshold voltage of the driving transistor into the storage capacitor after discharging is ended;

wherein the data writing module comprises a first transistor, a second transistor, a third transistor, a first scanning terminal and a second scanning terminal, wherein a gate of the first transistor is connected to the first scanning terminal, a first electrode thereof is connected to the high level input terminal, and a second electrode thereof is connected to the gate of the driving transistor;

a gate of the second transistor is connected to the second scanning terminal, a first electrode thereof is connected to the data line, and a second electrode thereof is connected to a second electrode of the third transistor; a first electrode and a gate of the third transistor are both connected to the gate of the driving transistor, and a threshold voltage of the third transistor is the same as the threshold voltage of the driving transistor;

the driving method comprises:

in the pre-charging phase, providing a turn-on signal to the first scanning terminal and providing a turn-off signal to the second scanning terminal respectively to make the first transistor turned on, the second transistor turned off, and storing the voltage of the high level input terminal into the storage capacitor through the first transistor;

in the compensating phase, providing the turn-on signal to the second scanning terminal and providing the turn-off signal to the first scanning terminal respectively to make the second transistor and the third transistor turned on, and at the same time, the first transistor turned off, and storing the data voltage and the threshold voltage of the third transistor into the storage capacitor after discharging is ended; and in the light-emitting phase, providing the turn-off signal to the first scanning terminal and the second scanning terminal respectively to make the first transistor and the second transistor turned off;

wherein the predetermined voltage writing module comprises a fourth transistor, a fourth scanning terminal and a predetermined voltage input terminal, a gate of the fourth transistor is connected to the fourth scanning terminal, a first electrode thereof is connected to the second electrode of the driving transistor, and a second electrode thereof is connected to the predetermined voltage input terminal, the driving method comprising:

in the pre-charging phase and the compensating phase, providing the turn-on signal to the fourth scanning terminal to make the fourth transistor turned on, and the second electrode of the driving transistor connected to the predetermined voltage input terminal; and in the light-emitting phase, providing the turn-off signal to the fourth scanning terminal to make the fourth transistor turned off, and the high level input terminal connected to the anode of the light-emitting element.

9. The driving method according to claim 8, wherein the predetermined voltage writing module further comprises a fifth transistor and a fifth scanning terminal, a gate of the fifth transistor is connected to the fifth scanning terminal, a first electrode thereof is connected to the high level input terminal, and a second electrode thereof is connected to the first electrode of the driving transistor, the driving method further comprising:

in the pre-charging phase and the compensating phase, providing the turn-off signal to the fifth scanning terminal; in the light-emitting phase, providing the turn-on signal to the fifth scanning terminal to make the fifth transistor turned off in the pre-charging phase and the compensating phase, and turned on in the light-emitting phase, so that the high level input terminal and the light-emitting element are disconnected in the pre-charging phase and the compensating phase and connected in the light-emitting phase.

10. The driving method according to claim 8, wherein a voltage inputted to the predetermined voltage input terminal is zero.

11. The driving method according to claim 8, wherein the low level input terminal is taken as the predetermined voltage input terminal.

12. A display apparatus, comprising a plurality of pixel circuits according to claim 1.

13. The display apparatus according to claim 12, wherein the data writing module has a first input terminal connected to the high level input terminal, a second input terminal connected to the data line, and an output terminal connected to the first terminal of the storage capacitor, and is configured to store a voltage of the high level input terminal into the storage capacitor in the pre-charging phase, so that a potential of the first terminal of the storage capacitor is higher than a potential of the second terminal of the storage capacitor in the compensating phase, and the storage capacitor is discharged and the data voltage and a voltage having a value equal to the threshold voltage of the driving transistor are stored into the storage capacitor after the process of discharging is ended.

14. The display apparatus according to claim 12, wherein the data writing module comprises a first transistor, a second transistor, a third transistor, a first scanning terminal and a second scanning terminal;

a gate of the first transistor is connected to the first scanning terminal, a first electrode thereof is connected to the high level input terminal, and a second electrode thereof is connected to the gate of the driving transistor;

a gate of the second transistor is connected to the second scanning terminal, a first electrode thereof is connected to the data line, and a second electrode thereof is connected to a second electrode of the third transistor, a first electrode and a gate of the third transistor are both connected to the gate of the driving transistor, and a threshold voltage of the third transistor is the same as the threshold voltage of the driving transistor;

the first scanning terminal is used to provide a turn-on signal in the pre-charging phase; and the second scanning terminal is used to provide the turn-on signal in the compensating phase.

* * * * *